(12) United States Patent
Hill (10) Patent No.: US 12,448,117 B2
(45) Date of Patent: Oct. 21, 2025

(54) HELICOPTER GROUND MOVEMENT SYSTEM AND METHOD

(71) Applicant: HILL GROUP TECHNOLOGIES LIMITED, Stafford (GB)

(72) Inventor: Jason Hill, Rugeley (GB)

(73) Assignee: HILL GROUP TECHNOLOGIES LIMITED, Rugeley (GB)

( * ) Notice: Subject to any disclaimer, the term of this patent is extended or adjusted under 35 U.S.C. 154(b) by 296 days.

(21) Appl. No.: 18/022,504

(22) PCT Filed: Aug. 23, 2021

(86) PCT No.: PCT/GB2021/052187
§ 371 (c)(1),
(2) Date: Feb. 21, 2023

(87) PCT Pub. No.: WO2022/038385
PCT Pub. Date: Feb. 24, 2022

(65) Prior Publication Data
US 2023/0322371 A1    Oct. 12, 2023

(30) Foreign Application Priority Data
Aug. 21, 2020    (GB) ..................................... 2013140

(51) Int. Cl.
*B64C 25/32*        (2006.01)
*B64C 25/24*        (2006.01)
(Continued)

(52) U.S. Cl.
CPC ............ *B64C 25/405* (2013.01); *B64C 25/24* (2013.01); *B64D 43/00* (2013.01); *B64D 47/08* (2013.01);
(Continued)

(58) Field of Classification Search
CPC . B64C 25/405; B64C 25/24; B64C 2025/325; B64C 13/042; B64C 25/10;
(Continued)

(56) References Cited

U.S. PATENT DOCUMENTS 9,108,479 B1    8/2015  Calvert
2009/0239703 A1*  9/2009  Carlhammar ....... B60L 15/2054
                                                        477/3

(Continued)

FOREIGN PATENT DOCUMENTS

EP    2340996 A1    7/2011
GB    2524097 A     9/2015

OTHER PUBLICATIONS

Examination Report of the United Kingdom Patent Office in related UK Patent Appl. GB2013140.5, dated Jun. 20, 2023, 5 pages.

*Primary Examiner* — Donald J Wallace
*Assistant Examiner* — Jalal C Coduroglu
(74) *Attorney, Agent, or Firm* — Bochner PLLC; Andrew D. Bochner (57) ABSTRACT

Disclosed is a ground movement system for a helicopter having a fuselage and rotor blades fixed to the top of the fuselage, the ground movement system comprising at least three wheels secured below the fuselage of the helicopter, the wheels being retractable during flight; a motor positioned in the hub or on the undercarriage leg of each of at least two of the wheels, wherein each motor is operable to rotate the wheel in forward and backward directions; wherein each motor allows the wheel to rotate freely when unpowered; at least one user interface operable to receive user input commands to control the speed and direction of travel of the helicopter using the ground movement system; and a control arrangement to provide control signals to each of the motors based on the user input commands.

18 Claims, 6 Drawing Sheets

(51) Int. Cl.
*B64D 43/00* (2006.01)
*B64D 47/08* (2006.01)
*G05D 1/437* (2024.01)
*H02J 7/14* (2006.01)
*H04N 7/18* (2006.01)

(52) U.S. Cl.
CPC ............. *G05D 1/437* (2024.01); *H04N 7/185* (2013.01); *B64C 2025/325* (2013.01); *H02J 7/14* (2013.01)

(58) Field of Classification Search
CPC ....... B64C 25/42; B64C 25/426; B64C 25/48; B64C 27/04; B64C 25/34; B64D 43/00; B64D 47/08; B64D 2045/0085; B64D 41/00; B64D 45/0005; G05D 1/437; H04N 7/185; H02J 7/14; B64U 2201/20; Y02T 50/80; B64F 1/002
See application file for complete search history.

(56) References Cited

U.S. PATENT DOCUMENTS

| | | | |
|---|---|---|---|
| 2009/0261197 A1* | 10/2009 | Cox | B64C 25/40 244/50 |
| 2010/0225503 A1* | 9/2010 | Cahill | B60T 17/22 340/960 |
| 2011/0036939 A1* | 2/2011 | Easter | B64C 37/00 244/46 |
| 2014/0180914 A1* | 6/2014 | Abhyanker | G06Q 10/0832 705/332 |
| 2015/0069178 A1* | 3/2015 | Brown | B64C 25/12 244/102 R |
| 2016/0129997 A9 | 5/2016 | Cox et al. | |
| 2017/0225680 A1* | 8/2017 | Huang | B60T 8/17558 |
| 2017/0249020 A1* | 8/2017 | Wild | G06F 3/016 |
| 2018/0044000 A1* | 2/2018 | Venturelli | B64C 25/405 |
| 2019/0023380 A1 | 1/2019 | Prud'Homme et al. | |
| 2021/0316606 A1* | 10/2021 | Hirt | B62D 7/02 |

* cited by examiner

HELICOPTER GROUND MOVEMENT SYSTEM AND METHOD

FIELD OF THE INVENTION

The present application relates to ground handling systems for aircraft. In particular, the application relates to ground movement systems for helicopters that are integrated into the helicopter and systems and methods for controlling the same.

BACKGROUND OF THE INVENTION

Light helicopters are traditionally provided with skids and larger helicopters typically have wheels for landing. It is necessary to move helicopters for parking with the engines shut down.

A helicopter with skids must either be lifted or a set of wheels attached to the skids to allow movement on the ground. Lighter helicopters can be moved by hand by pushing the helicopter once attached to the wheels. A separate vehicle can be used to push or tow the helicopter once the wheels are attached. Larger helicopters with landing gear comprising wheels are typically towed by vehicles on the ground.

Wheels provide additional drag on the helicopter during flight and so some helicopters have retractable wheels, which are retracted during flight to improve aerodynamic properties of the helicopter, and the wheels are then extended when the helicopter comes to land.

Helicopters are generally kept in hangars when not in use, in order to prevent deterioration due to long exposure to the elements. Using separate vehicles to provide ground movement is inconvenient and limiting when landing away from base, where suitable support vehicles may not be available.

It would be desirable to find an improved means of transporting helicopters when on the ground.

SUMMARY OF THE INVENTION

Aspects of the invention are set out in the independent claims and preferable features are set out in the dependent claims.

There is described herein a ground movement system for a helicopter having a fuselage and rotor blades fixed to the top of the fuselage, the ground movement system comprising: at least three wheels secured below the fuselage of the helicopter, the wheels being retractable during flight; a motor positioned in the hub or on the undercarriage structure of each of at least two of the wheels, wherein each motor and weighs preferably not more than 15 kg; wherein each motor is operable to rotate the wheel in forward and backward directions; wherein each motor allows the wheel to rotate freely when unpowered; and wherein each motor is operable to provide a torque of preferably at least 125 Nm (preferably at the wheel hub) and a power of preferably at least 1 kW; at least one user interface operable to receive user input commands to control the speed and direction of travel of the helicopter using the ground movement system; and a control arrangement to provide control signals to each of the motors based on the user input commands.

By providing motorised wheels fixed to the underneath of the helicopter it is possible to provide ground taxiing for the helicopter without requiring an additional set of attachable wheels to be provided after landing, and without needing to use the helicopter rotor blades. This allows the aircraft to be removed from the hanger and positioned for take-off or be returned to the hangar by a single person. References to power are preferably to peak power and references to torque are preferably to peak torque; on smooth level ground once moving the motor may only produce a relatively small torque or power but these figures are found to be useful for a range of conditions.

The wheels are permanently fixed to the helicopter; in other words, the wheels are not auxiliary or additional wheels that must be attached to the helicopter once it has landed. The wheels remain attached or fixed to the helicopter during flight, but are retractable during flight, which improves aerodynamics. Preferably the wheels are retractable into the helicopter fuselage. The undercarriage structure may comprise part of the fuselage and/or may comprise a leg extending from the fuselage for each wheel, on which the respective wheels are fixed.

The motors preferably cause the wheels to rotate, or spin, in both directions such that the helicopter can be moved either forwards or backwards using the ground handling system.

Providing motors that allow the wheels to rotate when the motors are not powered improves landing for the helicopter, as potential issues could be caused by maintaining the wheels in a rigid position when landing the helicopter.

Commonly there are three wheels for a helicopter landing gear, with one substantially below the nose of the helicopter and two main wheels attached below the fuselage further back. Or alternatively the helicopter may have two forward main wheels and one 'tail wheel' under the aft fuselage or tail boom. Preferably it is the two 'main wheels' that are provided with the motors. However, in other embodiments there may be four, five, six or even eight wheels, particularly when multiple wheels are used on a given undercarriage leg. Generally tt least two of the wheels will have motors, but where there are more wheels (particularly the case for larger helicopters) it may be preferable to have more than two having motors, such as three, four or five wheels having motors. In some embodiments all the wheels have motors. In alternative embodiments it may be possible to drive the helicopter ground movement system by providing a motor for only one wheel (preferably the nose wheel). In order to provide steering it would be necessary to make the nose wheel steerable in such an embodiment. In preferred embodiments a minimum of two wheels are provided with motors so it is possible to steer the castoring nose wheel.

Preferably each motor is not more than 20 cm thick (or in axial length), and not more than 30 cm in diameter. The wheels of the ground movement system are generally less than around 50 cm in diameter, sometimes less than around 40 cm in diameter. Generally the wheels will be greater than 10 cm or greater than 20 cm in diameter. When hub motors are used they are sized to fit within the hubs of these wheels. As such the motors are preferably not more than 15 cm or 10 cm thick (by thick we refer to the axial width or spatial extent of the motor from side-to-side of the wheel, as opposed to across the diameter of the wheel, or a cylindrical-shaped motor), sometimes not more than around 5 cm thick. The motors are preferably not more than 25 cm in diameter to ensure they fit within the wheel hub, sometimes not more than around 15 cm or 10 cm in diameter.

These motors are light (e.g. less than 5 kg), which improves flight efficiency, but the motors and motor mounting arrangements must also be capable of withstanding the significant forces exerted on them at landing. In some embodiments each of the motors are less than around 2.5 kg or less than around 1 kg. Generally each of the motors will be at least 1.5 kg to be able to effect movement of the helicopter, which may be at least around 1000 kg. In some embodiments the motors are at least around 2.5 kg, but preferably not more than around 10 kg or 8 kg.

By providing motors optionally with integrated gearboxes, that can provide a torque of at least 125 Nm and a power of at least 1 kW it is possible to exert a force at the diameter of a 35 cm diameter wheel of around 500N and to achieve a reasonable speed for manoeuvring the helicopter on the ground, such as a speed similar to walking speed of around 2 m/s. In some embodiments, each motor is operable to provide a torque of at least 125 Nm or at least 2,000 Nm. Generally due to the size and weight restrictions, the motor may not be able to provide torque of more than 5,000 Nm or of more than 10,000 Nm. In some embodiments each motor is operable to provide a torque of at least around 500 Nm and not more than around 6,000 Nm.

Preferably the helicopter ground movement system comprises a mounting arrangement mounting each motor to its respective wheel or undercarriage leg that is able to withstand a torque of at least 125 Nm. In some embodiments the mounting arrangement may be able to withstand a torque of at least around 200 Nm or at least around 500 Nm.

The ground movement system described herein may be particularly useful for light helicopters. Light helicopters may be capable of handling at least 4 occupants and at most 6 occupants including a pilot. A light helicopter may additionally or alternatively have an empty mass of less than 1000 kg and a maximum gross mass of between 1050 kg and 2000 kg.

The helicopter ground movement system may further comprise a motor power source for the motors separate from a power source for the rotor blades of the helicopter.

The helicopter rotor blades may be powered using a conventional engine, such as a turbine engine. Generally such systems have additional electric starter generators that require an electrical battery supply to power up the helicopter for flight, however it is advantageous to provide a separate power source for the motors, particularly to avoid hot starts for a turbine engine due to the starter generator battery not having enough stored energy. In a hybrid helicopter having a battery for powering the rotor, it may be possible to use the same battery for the ground movement system.

The motor power source can be an electrical battery power source. This means the main helicopter engine does not need to run when moving the helicopter on the ground and the battery used starting the engine can be conserved during ground handling. The electrical battery power source may be chargeable using energy generated by an engine of the helicopter during flight.

The secondary ground power source may be detachable from the helicopter and connected via a cable, in a similar fashion to existing ground power units used to support engine starting.

The ground movement system may further comprise a switching arrangement for selectively connecting the motor power source to a charging circuit to be charged by energy generated by an engine of the helicopter; and for disconnecting the electrical battery power source(s) from the charging circuit when the engine is not providing electrical power.

In some embodiments a switching arrangement is provided for selectively connecting the motor power source to a starter battery for the helicopter to enable the motor power source to be charged by energy generated by an engine of the helicopter and for disconnecting the motor power source from the starter batter when the engine is not providing electrical power.

The control arrangement may be operable to determine differential control signals for each motor based on user input commands to control the direction of travel according to the user input commands.

By providing differential control for each motor, turning and changing direction of the helicopter can be effected without the need for a separate mechanism. By differential control we mean the wheels are rotated at different rates which can be used to turn, or change direction of, the helicopter as a wheel on one side moves faster than a wheel on the other side of the helicopter. The differential control signals may be determined in terms of speed, power, force or torque values for each motor. As will be appreciated, different speeds for the helicopter may require different torques or forces when the helicopter is loaded differently. The differential control signals can be provided or communicated to each motor by the control arrangement.

The helicopter ground movement system may further comprise: a brake for each of the wheels, preferably located within the wheel hubs; wherein the control arrangement is operable to provide control signals to the brakes based on the user input commands.

By providing brakes for each of the wheels the helicopter can be stopped quickly and safely. In some embodiments it is only the wheels that have motors that will be provided with a brake.

Preferably the at least one user interface comprises a helicopter user interface fixed within the helicopter cockpit. Thus it is possible to provide user interface features from which a user can control ground handling of the helicopter from within the helicopter without auxiliary help from people on the ground.

The helicopter user interface preferably comprises: a projecting user interface element movable between an up position and a down position, wherein in the up position the projecting user interface element protrudes from a surface of the helicopter user interface.

The projecting user interface element may be in the form of a button. The projecting user interface element may project or protrude from the helicopter user interface in the up position, but not in the down position. In the down position the projecting user interface element may be in-line with, or sit substantially flush with, the surface of the helicopter user interface. The surface of the helicopter user interface may be substantially planar in shape.

The user interface element can be positioned in the down position when it is not required, e.g. during flight of the helicopter, so it does not interfere with other user interface components in the helicopter that may be used during flight of the helicopter. When the ground movement system needs to be used, the projecting user interface element can be moved into the up position The projecting user interface element may be attached to a spring arrangement to allow it to be maintained in the up or the down position. The projecting user interface element may be configured such that applying pressure to the projecting user interface element when it is in the down position may cause the projecting user interface element to move, or "pop up", to (and be maintained in) the up position. The projecting user interface element may be configured such that applying pressure to the projecting user interface element when it is in the up position may cause the projecting user interface element to move to, and be maintained in, the down position.

The projecting user interface element may be displaced a distance of between around 0.5 cm and 6 cm between the down and the up position. Where the inner depressible button is flush with the user interface surface in the down position, the top of the projecting user interface element may sit this distance (of between 1 cm and 6 cm) above the top of the surface of the user interface element when in the up position. In some embodiments the inner depressible button may be displaced a distance of between around 0.5 cm and 5 cm between the down and the up position.

Optionally the projecting user interface element is tiltable to receive user input when in the up position.

In some embodiments, the helicopter user interface comprises a rotatable and tiltable user interface element, such as a puck, and wherein rotating the user interface element provides a steering command to the ground movement system and tilting the puck provides a speed command to the ground movement system.

Additionally or alternatively, the at least one user interface may comprise a mobile user interface provided on a mobile device operable to communicate the user input commands to the motors and steering actuators over a wireless interface.

In some embodiments a further control panel user interface may be provided, either fixed to the fuselage (optionally near the tail) or via an umbilical cable to allow the system to be controlled externally when it is not possible or permissible to use a wireless device (near a fueling station for example).

The wireless interface may be a short-range wireless communication interface such as WiFi (IEEE 802.11), Bluetooth, Zigbee (IEEE 802.15.4) or Ultra-Wide Band, or another radio frequency interface, such as one that works in the 2.4 gigahertz band. Alternatively a longer range wireless communication system may be used, such as a cellular connection via the Internet.

Preferably both the mobile user interface and the helicopter user interface are provided to give both options for controlling the ground movement system. The user interfaces may be interlocked so only one can be used to control the ground movement system at any one time.

Optionally the mobile user interface is provided in an application on a mobile computing device such as a tablet or smartphone.

The helicopter ground movement system a may further comprise: control logic operable to limit the speed of movement of the helicopter on the ground, wherein the control logic is operatively linked to the wheel motors. The control logic can be incorporated in the control arrangement.

The control logic may limit the speed of the helicopter to a predetermined speed limit. In some cases the speed limit is not more than around 40 knots, or around 74 kph for high speed ground taxing. Generally the speed limit will be at least around 3 mph or around 5 kph. Preferably the speed limit is between around 5 mph (8 kph) and around 15 mph (21 kph).

In some embodiments, the helicopter ground movement system further comprises: one or more proximity sensors arranged on or near the outside of the helicopter and operable to sense the proximity of external objects surrounding the helicopter and to communicate with the at least one user interface; and the at least one user interface is operable to provide a warning signal in the event the proximity sensor outputs indicate the helicopter comes to within a threshold distance of an external object.

This can be helpful for avoiding collisions when using the ground movement system and can aid parking the helicopter in tight spaces, such as in hangars.

The warning signal may be a sound and/or visual warning. Providing a warning signal may comprise displaying a representation of the external surface of the helicopter and of one or more objects within the threshold distance of the helicopter. The threshold distance may be between around 40 cm and 5 m, preferably between around 50 cm and 3 m. There may be multiple warning thresholds, such that a first warning signal may be provided upon the helicopter coming within a first threshold distance of an object, but not within a second, smaller threshold distance. Upon the helicopter moving within the second threshold distance the helicopter may provide a second warning signal. For example the first threshold distance may be between around 80 cm and 3 m and the second threshold distance may be between around 20 cm and 1 m, or between around 20 cm and 80 cm.

The helicopter ground movement system can optionally comprise: one or more proximity sensors arranged on or near the outside of the helicopter and operable to sense the proximity of external objects surrounding the helicopter and to communicate to the control arrangement proximity data indicative of the proximity of external objects; and the control arrangement may be operable to alter control signals that are based on the user input commands in dependence on the proximity data to avert a collision with an external object.

For example, the speed may be reduced or the helicopter may be brought to a stop by stopping the motors or applying the brakes. The control arrangement may be configured to begin altering control commands in dependence on (or based on) proximity data when the proximity data indicates an external object is within a first threshold distance of the helicopter, and that the distance between the object and helicopter is decreasing, or the helicopter is moving towards the object. The control arrangement may be operable to alter the control signals to prevent the helicopter coming within a second, smaller threshold distance of the external object. Thus collisions may be avoided.

The helicopter ground movement system may additionally or alternatively comprise one or more cameras arranged around the helicopter and operable to send live video images of the helicopter surroundings to the at least one user interface.

This is useful for both occasions when the user is controlling the ground movement system from a user interface mounted in the helicopter as the helicopter may not permit the user to see every surrounding angle when seated in the helicopter. It is also useful when the user is controlling the ground movement system from a mobile user interface located outside of the helicopter as they may not be able to see how close the helicopter is to surrounding objects.

Preferably the helicopter ground movement system further comprises one or more doors hingedly or slidably to the fuselage of the helicopter for each wheel, wherein the doors are arranged to enclose each wheel within the fuselage in a retracted position, and to open in order to allow the wheel to be deployed for landing. This improves the aerodynamics of the helicopter during flight.

There is also described herein a helicopter having a fuselage and rotor blades fixed to the top of the fuselage and comprising a ground movement system substantially as described above.

There is also described herein: a ground movement method for a helicopter having a fuselage and rotor blades fixed to the top of the fuselage at least three wheels secured below the fuselage, the ground movement method comprising: receiving user input commands to control the speed and direction of travel of the helicopter via a user interface; determining, based on the received user input commands, control signals for a first motor positioned in the wheel hub of a first of the at least three wheels and arranged to rotate the first wheel and control signals for a second motor positioned in the wheel hub of the second of the at least three wheels and arranged to rotate the second wheel; and communicating the control signals to each of the first motor and the second motor.

The ground movement method may further comprise: determining, based on the received user input commands, control signals for a first brake arranged to apply a braking force to the first wheel and control signals for a second arranged to apply a braking force to the second wheel; and communicating the control signals to each of the first wheel and the second wheel.

The user interface may be removable from the helicopter, and the method may therefore further comprise: transmitting the user input commands over a wireless communication interface from the user interface to a control arrangement operable to determine the control signals and communicate the control signals to each of the first motor and the second motor, and where applicable to each of the first wheel and the second wheel.

The ground movement method optionally further comprises: receiving proximity data from one or more proximity sensors arranged on the outside of the helicopter, the proximity data being indicative of the proximity of one or more external objects to the helicopter; determining from the proximity data within that the helicopter is within a threshold distance of an external object; communicating the proximity data or data indicative of the proximity data to the at least one user interface; and providing a warning signal on the user interface in dependence on the determination that the helicopter is within the threshold distance of an external object.

In some embodiments the warning may be provided based on the helicopter being within a threshold distance and moving towards the external object at more than a threshold speed, e.g. 3 mph or 5 mph.

The ground movement method may further comprise: receiving proximity data from one or more proximity sensors arranged on the outside of the helicopter, the proximity data being indicative of the proximity of one or more external objects to the helicopter; determining from the proximity data within that the helicopter is within a threshold distance of an external object; and altering the determined control signals based on the proximity data prior to communicating the control signals to the first and second motors, and optionally to the first and second brakes.

Altering the control signals may comprise reducing the levels of speed or power signals communicated to the motors or increasing levels of braking signals communicated to the brakes.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Methods and systems for moving helicopters on the ground are described by way of example only, in relation to the Figures, wherein.

DETAILED DESCRIPTION

Landing Gear

Figure 1:
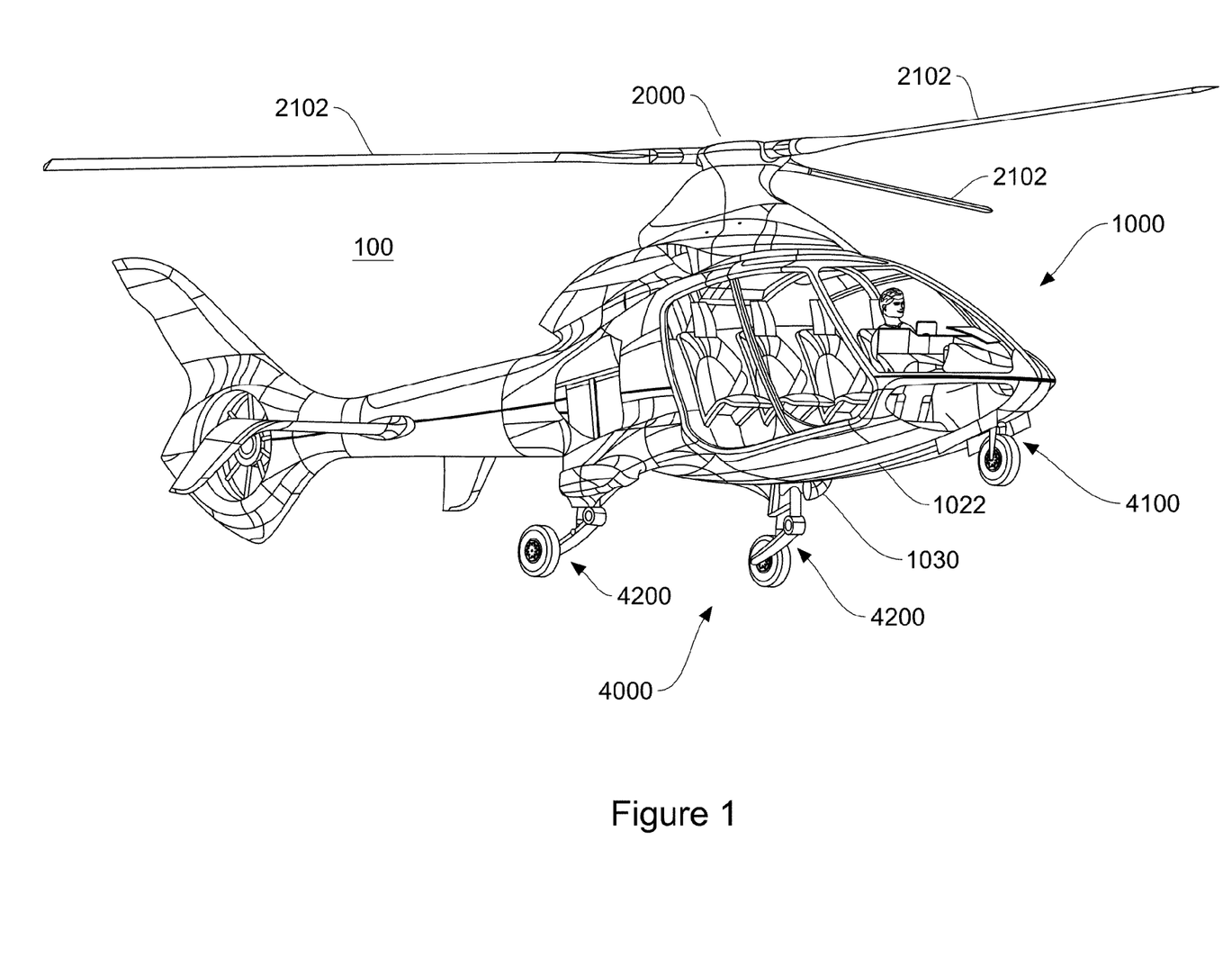
FIG. 1 shows a perspective view of a helicopter having a ground movement system.
Figure 2:
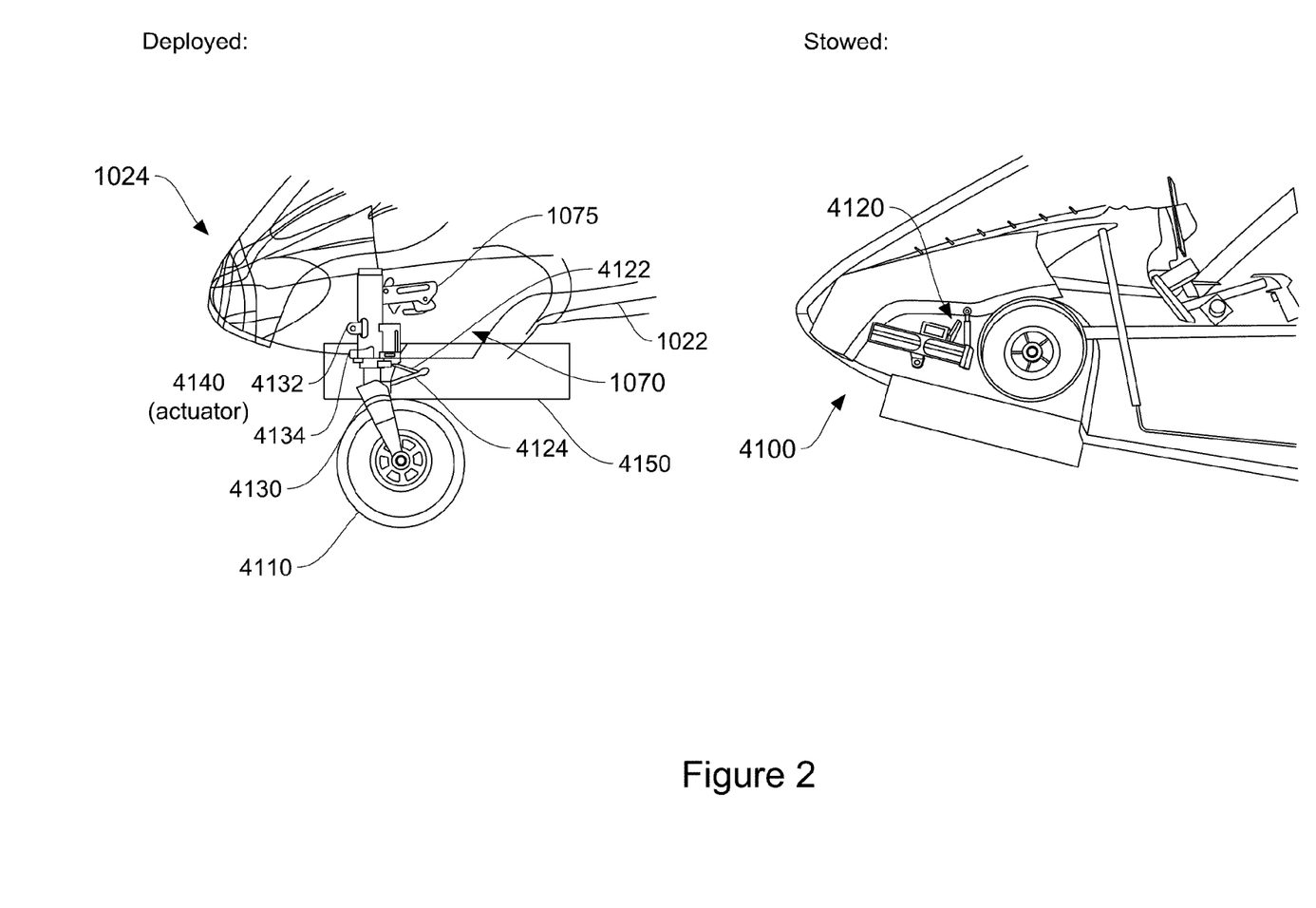
FIG. 2 illustrates a side view of the landing gear at the nose of the helicopter of FIG. 1, showing the landing gear in stowed and deployed configurations.
Figure 3:
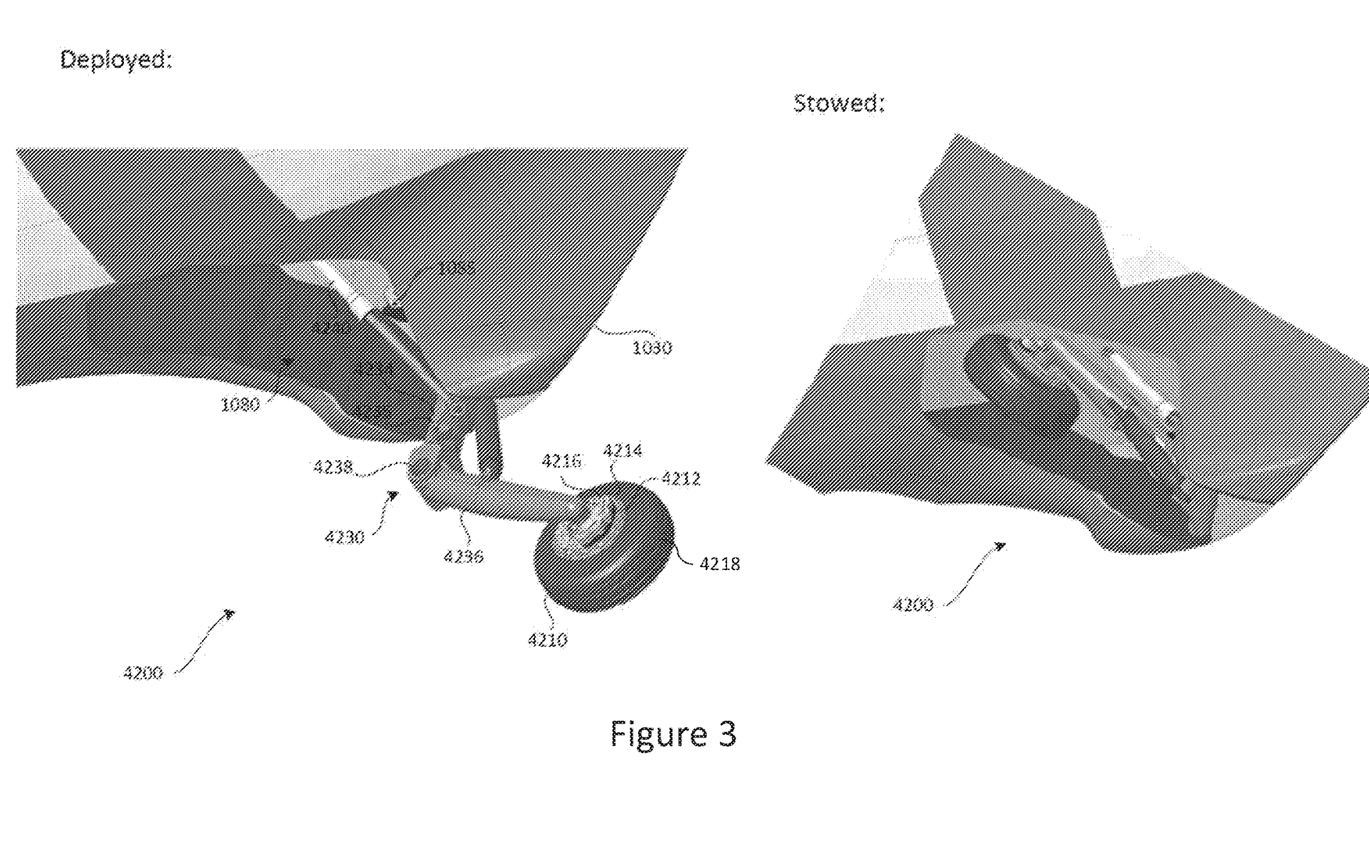
FIG. 3 shows a perspective of the main landing gear of the helicopter of FIG. 1, showing the landing gear in stowed and deployed configurations.

Referring to FIGS. 1 to 3 a helicopter having a ground movement system will now be described.

FIG. 1 shows a helicopter 100 having a fuselage 1000, a main rotor assembly 2000 and a landing gear arrangement 4000. The main rotor assembly 2000 is fixed to the top of the fuselage and comprises main rotor blades 2102. The helicopter 1000 in this example has three main rotor blades 2102.

Towards the rear and bottom and on each of the left and right sides of the fuselage 1000, is a wheel fairing 1030. The wheel fairings 1030 project generally outwardly and downwardly from the rear of the fuselage 1000 and provide lateral stability for the helicopter 100 when in forward flight.

The landing gear arrangement 4000 is secured underneath the fuselage 1000 to support the helicopter 100 when on the ground. The landing gear arrangement 4000 provides a base for the helicopter 100 when on the ground. Three or more wheels may be used for the landing gear 4000. Here three wheels are used, with two disposed towards the rear of the helicopter 100 and one towards the front of the helicopter 100. This provides a generally triangular base.

The landing gear arrangement 4000 is retractable into the bottom 1022 of the fuselage 1000 and comprises at least one nose wheel assembly 4100 and a plurality of main wheel assemblies 4200, in this case two main wheel assemblies 4200. The landing gear arrangement 4000 has a stowed configuration and a deployed configuration, and is arranged to move between the configurations in response to receiving a landing gear control input. The landing gear arrangement 4000 has shock-absorbing capabilities and, when in the deployed configuration, can support the helicopter 100 from a ground surface and capable of reliably withstanding landing loads arising from a free fall from a height of 0.33 m at the maximum gross weight of the helicopter 100 without permanently deforming. This allows the helicopter 100 to perform hurried or emergency landings without injuring or causing discomfort to any occupants.

FIG. 2 show the nose wheel assembly 4100 from the side in a deployed and a stowed configuration. The nose wheel assembly 4100 is retractable into a nose wheel cavity 1070 located adjacent the bottom 1022 and towards the front 1024 of the fuselage 1000. The nose wheel assembly 4100 includes a nose wheel 4110, an elongate forked leg member 4130 arranged to hold the nose wheel 4110, and a mechanical linkage 4120 attached to the leg member 4130 and formed of first and second links 4122, 4124. The leg member 4130 is attached via a pivot 4132 to a surface in the nose wheel cavity 1070. The nose wheel 4110 is coupled to the forked leg member 4130 such that the wheel 4110 is freely rotatable about an axle. The forked leg member 4130 comprises a dashpot and a spring configured to provide shock-absorbing capability for forces applied along the length of the leg member 4130.

An actuator 4140 is coupled to the leg member 4130 and to a surface in the nose wheel cavity 1070. The actuator 4140 is arranged to vary the nose wheel assembly 4100 between the stowed configuration and the deployed configuration upon receipt of a control input. In this example, the actuator 4140 is arranged to receive an electrical control signal to mechanically extend or to retract. In response to receiving such a control signal, the actuator 4140 extends or retracts causing the nose wheel assembly 4100 to adopt the deployed configuration or the stowed configuration correspondingly.

In the stowed configuration, the nose wheel assembly 4100 is stored in the nose wheel cavity 1070 such that the leg member 4130 is oriented with its length substantially parallel to a plane of the bottom 1022 of the fuselage 1000, and a front latch mechanism 1075 engages with a lug 4134 disposed on the leg member 4130 to secure the assembly 4100 inside the cavity 1070.

Doors 4150 are hingedly attached to the bottom 1022 of the fuselage 1000 and, when the landing gear arrangement 4000 is in the stowed configuration, are closed to conceal the cavity 1070 externally of the helicopter 100 and form an exterior surface flush with the bottom 1022 of the fuselage 1000. In the deployed configuration, the doors 4150 are open and provide an aperture through which the nose wheel assembly 4100 projects from the nose wheel cavity 1070 downwardly of the bottom 1022 of the fuselage 1000. In other examples, a single door may be used, or one or more panels may be configured to slide back and forth in order to expose and conceal the cavity 1070.

FIG. 3 shows one of the main wheel assemblies 4200 from a perspective view in a deployed and a stowed configuration. The main wheel assemblies 4200 are retractable into main wheel cavities 1080 located in the wheel fairings 1030. Each main wheel assembly 4200 comprises a main wheel 4210 and a jointed leg 4230 arranged to hold the main wheel 4210. The leg 4230 is attached via a pivot 4232 to a surface in the main wheel cavity 1080 and comprises an upper member 4234 and lower member 4236 pivotally connected at a knee joint 4238. The main wheel 4210 is coupled to a stub axle disposed at a distal end of the lower member 4236 such that the wheel 4210 is rotatable about an outer-facing stub axle.

An actuator 4240 is coupled to the upper member 4234 and to a surface in the main wheel cavity 1080. The actuator 4240 is arranged to vary the main wheel assembly 4200 between the stowed configuration and the deployed configuration upon receipt of a control input. In this example, the actuator 4240 is arranged to receive an electrical control signal to mechanically extend or to retract. In response to receiving such a control signal, the actuator 4240 extends or retracts causing the main wheel assembly 4200 to adopt the deployed configuration or the stowed configuration correspondingly.

In the stowed configuration, the main wheel assembly 4200 is stored in the main wheel cavity 1080 such that a rear latch mechanism 1085 engages with a lug 4235 disposed on the leg member 4230 to secure the assembly 4200 inside the cavity 1080.

A portion of the wheel fairing 1030 is hinged and, when the landing gear arrangement 4000 is in the stowed configuration, is closed to conceal the cavity 1080 externally of the helicopter 100 and form an exterior surface flush with the rest of the wheel fairing 1030.

In the deployed configuration, the hinged portion of the wheel fairing 1030 opens and provides an aperture through which the main wheel assembly 4200 projects from the main wheel cavity 1080 downwardly of the bottom 1022 of the fuselage 1000 and outwardly of the width of the fuselage 1000. When deployed, the main wheels 4210 define a track width 4300 as the distance between their points of contact with the ground surface. The track width 4300 is wider than the maximum cabin width 1102, providing increased stability over wheels which project directly downward from a rotorcraft's fuselage.

Each of the main wheels 4210 comprises a hub 4212, an electric motor 4214 mounted to the hub 4212 or undercarriage leg 4234 or 4236, and a brake 4216 mounted to the hub 4212. Wiring for the electric motor 4214 and the brake 4216 is housed within a conduit formed through the upper member 4234 and lower member 4236 and is configured to provide power and control signals to the motor 4214 and brake 4216. The electric motors 4214 in each main wheel assembly 4200 are independently controllable, allowing the helicopter to achieve ground navigation using differential steering. The main wheel assembly 4200 includes a shock-absorber pivotally connected to the upper and lower members 4234, 4236, the shock-absorber comprising a dashpot and a spring. The shock-absorber provides shock-absorbing capability against forces applied substantially normal to a ground surface on which the helicopter 100 rests.

The wheels 4210 are made up of a hub 4212 surrounded by a tyre 4218. Each of the main wheels 4210 is roughly cylindrical in shape, having a circular cross-section with an outer diameter of around 40 cm around the tyre 4218 and a thickness, or width, around the tyre of around 12 cm. The main wheel hubs 4212 are around 25 cm in diameter and are slightly wider than the tyre 4218, being around 14 cm in diameter. The electric motors 4214 in each main wheel 4212 fit within the hub 4212.

As explained above, the motors 4214 of each main wheel assembly 4200 can be driven independently. This means the motors 4214 can be driven at different powers to provide differential steering for the helicopter 100.

Ground Handling System

Figure 4:
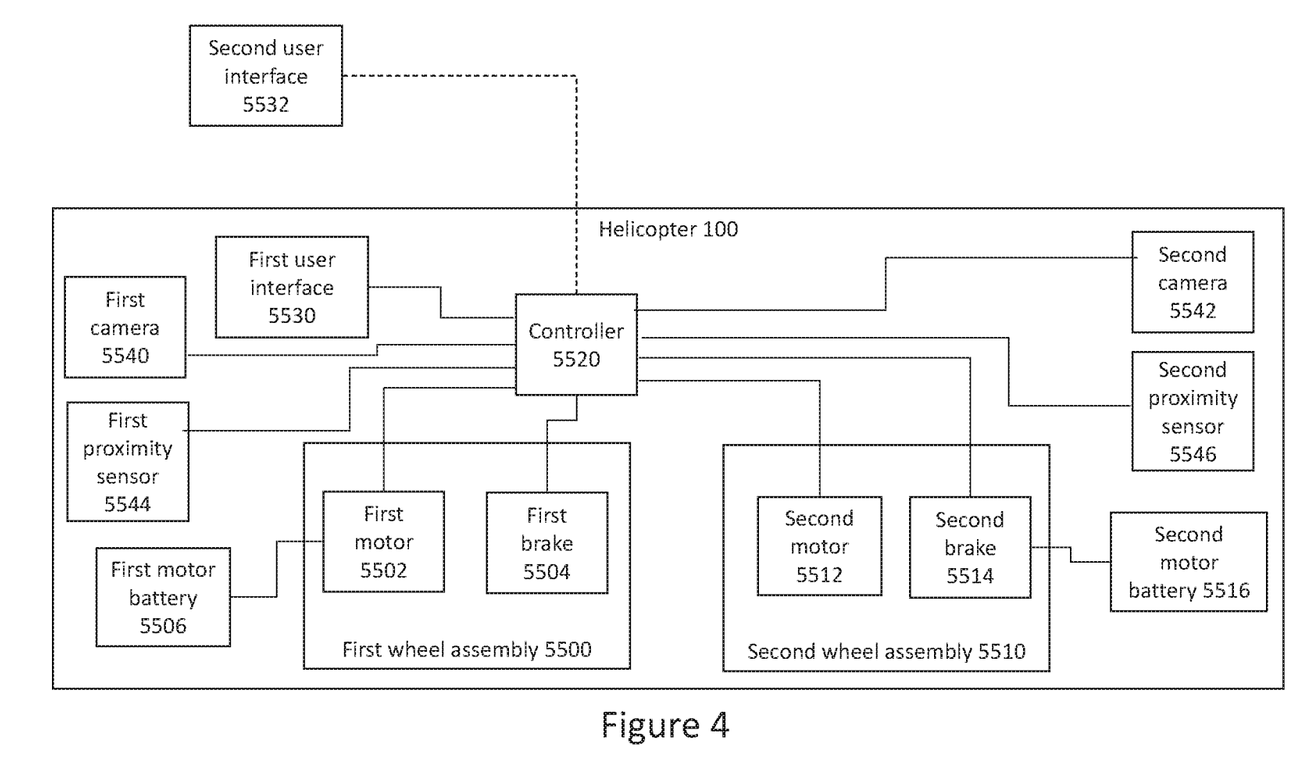
FIG. 4 is a block diagram of a ground movement system, such as the one in the helicopter of FIG. 1.

FIG. 4 shows a block diagram of a ground movement system, such as the ground movement system shown in the Figures above. The ground movement system comprises a first wheel assembly 5500 and a second wheel assembly 5510, which can be of the type of the main wheel assemblies 4200 shown in and described in relation to the Figures above.

The first wheel assembly 5500 comprises a first motor 5502 and a first brake 5504 operatively coupled to a first wheel (not shown). There is also a first motor battery 5506 for powering the first motor 5502. The first motor 5502 is located in the hub of the first wheel and is arranged to rotate the first wheel in backwards and forwards directions. The first wheel assembly 5500 also includes a first brake 5504, coupled to the first wheel such that it can slow the wheel down to a stop.

The second wheel assembly 5510 comprises a second motor 5512 and a second brake 5514 operatively coupled to a second wheel (not shown). There is also a second motor battery 5516 for powering the second motor 5512. The second motor 5512 is located in the hub of the second wheel and is arranged to rotate the second wheel in backwards and forwards directions. The second wheel assembly 5510 also includes a second brake 5514, coupled to the second wheel such that it can slow the wheel down to a stop.

The first motor 5502 and the second motor 5512 can be controlled and powered independently. For example, if the motor 5502, 5504 are run at different powers they will drive their respective wheels at different speeds and the helicopter 100 will turn as it moves.

The ground movement system comprises a controller 5520 communicably coupled to the first motor 5502, the first brake 5504, the second motor 5512 and the second brake 5514. The controller 5520 is located within the helicopter 100 and are coupled to the motors 5502, 5512 and brakes 5504, 5514 via wires that pass through the helicopter 100 and extend to the wheel hubs. However in alternative embodiments wireless communication between the controller 5520 and the motors 5502, 5512 and brakes 5504, 5514 could be envisaged (although this tends to use more power). The controller 5520 provides control signals to drive the motors 5502, 5512 and the brakes 5504, 5514 according to a user's input commands. Thus the controller 5520 can derive suitable commands to cause the motors to move the helicopter forwards or backwards or turn, as required.

The helicopter 100 includes a first user interface 5530 communicably coupled to the controller 5520. A user can input speed and direction commands to the first user interface 5530, which can be communicated to the controller 5520, which determines the control signals for the motors and brakes.

The first user interface 5530 is located in the cockpit of the helicopter 100, preferably near to pilot's seat so that the pilot can input commands immediately after landing or before taking off. The first user interface 5530 is communicatively coupled to the controller 5520 via wires, although wireless connection, e.g. over RF signals such as WiFi, Bluetooth or Zigbee, is also possible.

The ground movement system comprises a second user interface 5532 communicably coupled to the controller 5520. As with the first user interface 5530, a user can input speed and direction commands to the second user interface 5532, which can be communicated to the controller 5520, which determines the control signals for the motors and brakes.

The second user interface 5532 is a mobile communication device and as such may be positioned within the helicopter 100, but may also be located outside the helicopter 100. The second user interface 5532 communicates with the controller 5520 via wireless communications, for example WiFi (IEEE 802.11), Zigbee (IEEE 802.15.4) or other types if radio frequency communication. In some embodiments the second user interface 5532 may be connected to a long-range network, such as a cellular network and thus to the Internet and the controller 5520 may also be connected via a long-range wireless network, e.g. cellular, to the Internet, to enable communication between the two.

The second user interface 5532 may be a device specifically provided for the controlling the helicopter ground movement system, such as a dedicated remote control. Alternatively it may be a generic electronic mobile communication device such as a smartphone, tablet or laptop, which may be loaded with an application to enable the user interface functionality to allow steering and speed commands to be input. Advantageously this means the ground handling system can be controlled by a single person located outside the helicopter 100, which may help with spatial awareness and ease of manoeuvre.

The ground movement system also comprises a first camera 5540 and a second camera 5542 on the helicopter 100. These cameras 5540, 5542 face out of the helicopter 100 in different directions so they can take photographs and video of the immediate surrounding of the helicopter 100. The cameras 5540, 5542 are communicably coupled to the first user interface 5530 and/or to the second user interface 5532 via the controller 5520. The cameras 5540, 5542 transmit images of the area surrounding the helicopter 100 to the user interfaces 5530, 5532 in real time, where they are displayed on a display of the user interface 5530, 5532 so that the user can see if there are any surrounding objects with which the helicopter 100 may collide. This may be particularly useful for when the user is located within the helicopter and vision out the back of the helicopter 100 is not very clear. It may also be useful when a user is outside the helicopter 100 but trying to position the helicopter 100 in a tight space, such as for parking in a hanger.

The ground movement system also comprises a first proximity sensor 5544 and a second proximity sensor 5546 on the helicopter. These proximity sensors 5544, 5546 face in different directions and measure the distance to objects next to the helicopter 100. The proximity sensors 5544, 5546 may be electromagnetic or ultrasonic.

The proximity sensors 5544, 5546 are communicatively coupled to provide this information to the user on user interfaces 5530, 5532. For example, the user interfaces 5530, 5532 may provide a diagrammatic representation of part of the fuselage of the helicopter 100 and an object proximate the helicopter 100 detected using the proximity sensor. The user interfaces 5530, 5532 may provide a warning or alarm if objects are detected within a threshold distance. Thus proximity sensors may help prevent accidents.

In some embodiments if one of the proximity sensors 5544, 5546 communicates to the controller 5520 that it has detected an object within a threshold distance of the helicopter, such as 1 m, 50 cm or 20 cm, and the controller 5520 identifies that the helicopter is moving towards the object (i.e. the distance is decreasing, or that speed and direction controls show the helicopter 100 moving towards the object), then the controller 5520 may act to prevent a collision. For example, the controller 5520 may send a command to stop one or both of the motors 5502, 5512 from driving the wheels and/or may send a command to activate one or both of the brakes 5504, 5514.

Although only two cameras 5540, 5542 are shown, in some embodiments more cameras are provided, to provide views in multiple directions. Although only two proximity sensor 5544, 5546 are shown, in preferred embodiments there are more, such as four proximity sensors, to check in all directions. Equally in some embodiments only one camera or one proximity sensor is provided, e.g. at the rear of the helicopter 100. The cameras and proximity sensors may be an optional feature and not provided at all in some implementations.

Although two user interfaces 5530, 5532 are shown, in some embodiments only one is present. For example, only the first user interface 5530 inside the helicopter 100, or only the second user interface 5532 that is mobile and operable to communicate with the controller 5520 wirelessly.

Although the controller 5520 is shown inside the helicopter 100, in some embodiments the controller 5520 is located outside the helicopter 100, e.g. within the second, mobile user interface 5532.

Although in this example the motor batteries 5506, 5516 are not shown as part of the wheel assemblies 5500, 5510 as they remain inside the fuselage 1000 of the helicopter 100, in some examples the batteries 5506, 5516 are provided with the motors 5502, 5512 in the wheel hubs of the first and second wheel assemblies 5500, 5510.

Although in this example there are separate motor batteries 5506, 5516 for the wheel assemblies 5500, 5510, in other embodiments the motors 5502, 5512 may both be powered by the same battery.

Although only two main wheel assemblies having motors are shown, there may be multiple motorised wheel assemblies arranged in the same manner, such as four, five or six, generally for larger helicopters.

User Interface

Figure 5:
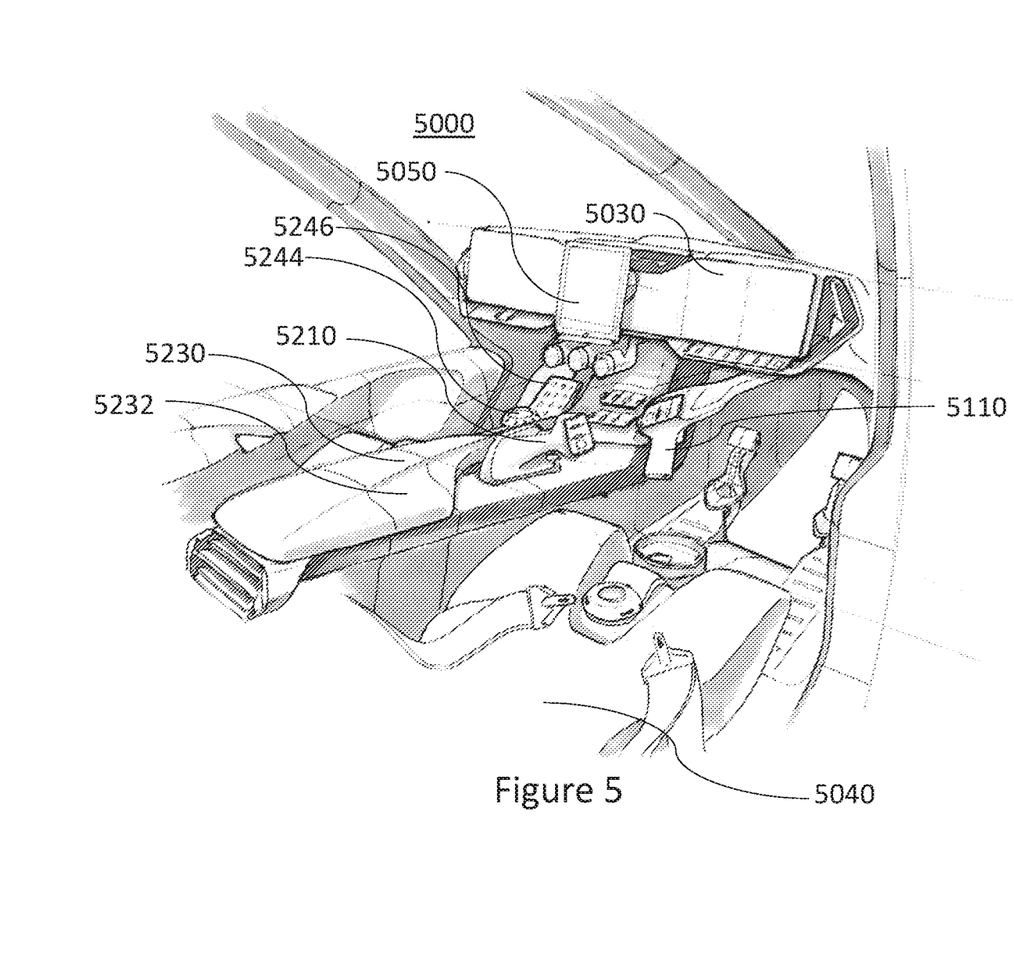
FIG. 5 shows a helicopter cockpit having a user interface for controlling a ground movement system, such as the one in the helicopter of FIG. 1.

FIG. 5 shows an illustration of part of the inside of a cockpit of a helicopter, such as the helicopter 100 described above. The cockpit has a pilot control arrangement 5000 for allowing pilot control of the helicopter 100.

The cockpit comprises a pilot's seat 5040 on the right hand side of the cockpit, as is conventional in helicopters. Above the pilot's seat 5040 and slightly in front of the seatback is a cyclic control handle 5110. In front of the pilot's seat is an instrument panel 5030, which may hold instrument displays such as altimeters, radios, speed gauges and the like, which are required in helicopters.

Mounted towards the centre of the cockpit and in line with the instrument panel 5030 is a tablet computer 5050, such as an iPad. The tablet computer 5050 is communicably coupled to control systems in the helicopter, either via a detachable wired connection, or via a wireless connection, such as WiFi, Zigbee or Bluetooth. The tablet computer 5050 may be loaded with specialist applications for navigation and controlling the helicopter 100. As such, the tablet computer 5050 can be used as the second user interface 5532, described above in relation to FIG. 4. Speed and direction controls for the helicopter movement system can be input via touchscreen buttons displayed on the screen of the tablet. Images from cameras on the helicopter and proximity data from position sensors can be displayed on the tablet to aid control of the helicopter movement system.

To the left of the pilot's seat 5040 is an armrest 5230. The armrest 5230 is located on top of a central cockpit divider 5234, which extends down the centre of the cockpit in a forward/back direction (longitudinal), from the instrument panel 5030 to the seatback of the pilot's seat 5040. The central cockpit divider 5234 divides the left side of the cockpit from the right side. As is conventional, the pilot's seat 5040 is shown on the right of the cockpit and there is a seat for a co-pilot or passenger on the left of the cockpit (not shown).

At the back of the armrest 5230 is an elbow support 5232. The elbow support 5232 comprises a generally horizontal surface located at a height to support the pilot's elbow when seated in the pilot's seat 5040. In this example the elbow support portion 5232 is located towards the right-hand side of the armrest 5230 and is slightly lower than a horizontal surface on the left of the armrest 5230, which is for a passenger or co-pilot seated Forward of the elbow support 5232 is a collective handle 5210 supported in an elongate channel 5212 such that it is grippable by the pilot. A user interface portion 5240 of the armrest 5230 is located on the left of the armrest, level with the collective handle 5210.

The user interface portion 5240 of the armrest 5230 comprises user input features, such as numerical keypads, buttons, rotatable knobs and/or rotatable puck selectors, with which the pilot can input certain controls, such as radio control. Locating this arrangement on the armrest allows the pilot to easily switch between inputting commands on the user interface and adjusting the collective pitch of the helicopter blades.

At the left side of the user interface portion 5240 is a rotatable puck selector 5244. Directly in front of the puck selector 5244 is a keypad 5266 comprising twelve buttons. These user interface components can be used to input and select options. As the user interface portion 5240 is integrated into the armrest of the cockpit, communication to helicopter control systems is via a wired connection.

The puck selector 5244 can be used as a user interface element for the helicopter movement system, such as for first user interface 5530 located in the helicopter that is described above in relation to FIG. 4. Speed and direction controls for the helicopter movement system can be input via the puck selector 5244, as described in more detail below. For example, in one embodiment twisting or rotating the puck selector 5244 provides steering input to the helicopter movement system and tilting the puck selector 5244 in a forwards direction increases forward speed of the helicopter, whilst tilting the puck selector 5244 in the backwards/aft direction increases backwards speed of the helicopter. Images from cameras on the helicopter and proximity data from position sensors can be displayed on the instrument panel 5030 (particularly when the tablet 5050 is not present) to aid control of the helicopter movement system.

Figure 6:
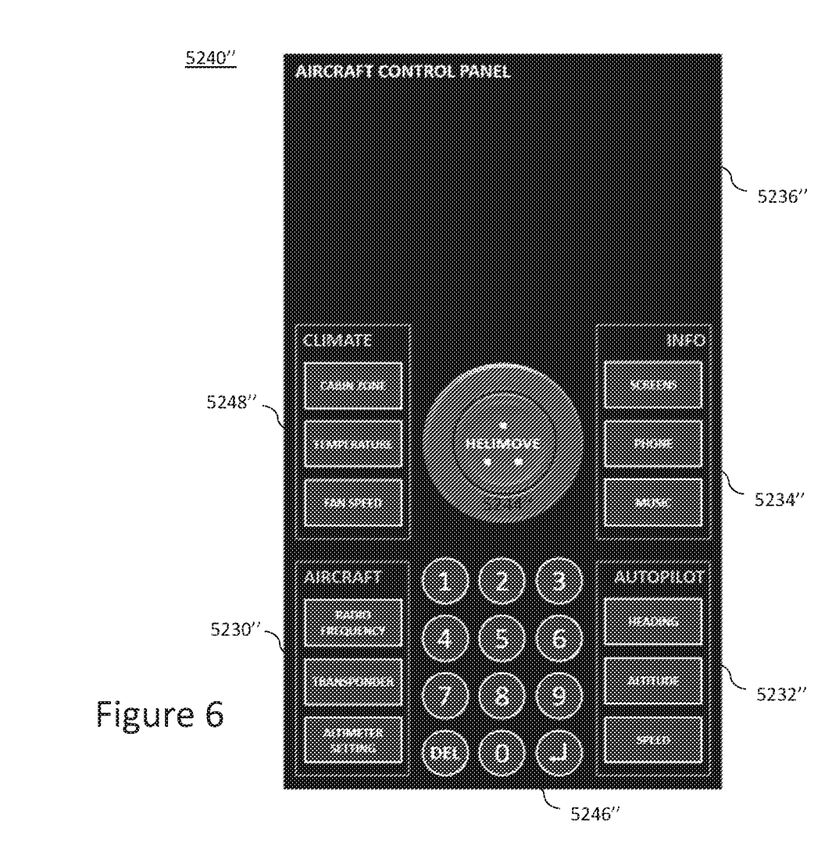
FIG. 6 shows a user interface suitable for controlling the ground movement system for the helicopter of FIG. 1.

FIG. 6 shows a user interface portion 5240" suitable for the pilot input arrangement 5400 described above, and may be used in the cockpits shown in FIG. 5. The user interface portion 5240" may form all or part of the first user interface 5530 in the helicopter 100 of FIG. 4.

The user interface portion 5240" has a numerical keypad 5246", which may be used as the numerical keypad 5402 of the pilot input system 5400 described above. The numerical keypad 5246" has 12 buttons, including 10 number keys, a delete key and an enter key.

The user interface portion 5240" also has a rotatable puck selector 5244". The rotatable puck selector 5244" can be used by rotating to scroll between selectable options and adjust input values. The rotatable puck selector 5244" can also be depressed to confirm a selection of an option. Thus the user is provided with a choice for input entry, either using the numeric keypad 5246" or the rotatable puck selector 5244".

Apart from the puck selector 5244", the user interface portion 5240" shown is provided as a touch screen. User-selectable options for various input functions are provided on the touch screen. The selectable options are arranged as menu soft keys to allow rapid function selection. The arrangement of these options around the puck selector 5244" provides a user interface that is very easy for the user to use quickly and efficiently.

Climate control touch keys 5248" are provided to the left of the puck selector 5244". These provide options for the user to select control of the cabin zone, the temperature in the cabin or the fan speed.

Avionics system touch keys 5230" are provided to the left of the keypad 5246". The avionics system touch keys 5230" provide options for the user to change the input function of the pilot input arrangement to provide a radio frequency input, a transponder code or an altimeter setting (generally a pressure setting).

Autopilot touch keys 5232" are provided to the right of the keypad 5246". The autopilot touch keys 5232" provide options for the user to cause the pilot input arrangement to switch to an input function for inputting a heading, an altitude or a speed for the autopilot.

Infotainment touch keys 5234" are provided to the right of the puck selector 5244". These provide options for the user to change the pilot input arrangement to an input function for selecting entertainment for an entertainment screens of the aircraft, for inputting phone system options or for inputting music options.

Above the rotatable puck selector 5244" there is a display area 5236" of the touchscreen. This is for displaying selection details of the user's selection (e.g. to show the selected input function of the pilot input arrangement) and input data, such as a frequency or transponder code or altimeter setting input by the user via the keypad 5246" or the rotatable selector 5244".

The user interface portion 5240" may have a ground movement mode in which it is operable to receive inputs for controlling a ground movement system, such as the ground movement system described above.

In some embodiments images from one or more cameras that show views of helicopter surroundings (such as cameras 5540, 5542) may be displayed on the display area 5244" when the user interface portion 5240" is in a ground movement mode. This may help the user to control the ground movement system safely by providing views they cannot see or cannot see clearly from the cockpit.

Alternatively or additionally in some embodiments data from one or more proximity sensors (such as proximity sensors 5544, 5546) may be displayed on the display area 5244" when the user interface portion 5240" is in a ground movement mode. This may help the user to control the ground movement system safely by providing information about potential obstacles they cannot see or cannot see clearly from the cockpit.

Rotatable Selector

Figure 7:
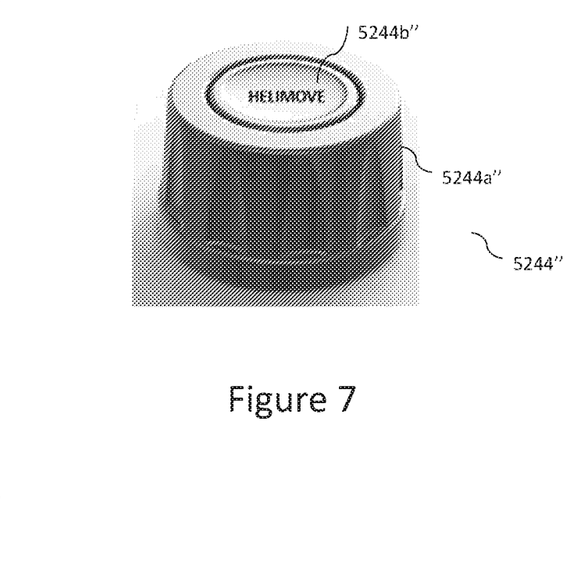
FIG. 7 shows a close-up of a user interface feature of the user interface of FIG. 6.

FIG. 7 shows a close-up of a user interface feature of the user interface of FIG. 6. FIG. 7 shows the rotatable puck selector 5244" of the user interface portion 5240". The rotatable puck selector 5244" comprises a rotatable outer portion 5244a" and a depressible inner portion 5244b".

Rotating the outer rotatable portion 5244a" can allow the user to scroll between selectable options and adjust input values. The outer rotatable portion 5244a" can also be depressed to confirm a selection of an option.

The inner depressible portion 5244b" can be moved between a down position (in which its top is substantially flush with the outer rotatable portion 5244a") and an up position (in which it projects outwards from the outer rotatable portion 5244a".

When released up the inner depressible portion 5244b" can be used as a speed and steering controller for a ground movement system of the aircraft. In the up position the inner depressible portion 5244b" is rotatable. Rotating the inner depressible portion 5244b" provides a steering input to the ground handling system. In the up position the inner depressible portion 5244b" is also tiltable. Tilting the inner depressible portion 5244b" forwards and backwards provides a speed input for the ground handling system. The further forward from a neutral central position, or more forward force used, the faster the aircraft will move in a forwards direction. The further backward from the neutral central position, or the more backward force used, the faster the aircraft will move a backwards direction.

Moving the inner depressible portion 5244b" from the down to the up position can cause a function selector to change the pilot input arrangement into a ground handling input mode.

Although the above description has been directed towards a helicopter, as will be appreciated the presently described pilot input arrangement is also applicable to other aircraft, such as fixed-wing aircraft (e.g. aeroplanes) and has particular applications for light aircraft.

While a specific architecture is shown, any appropriate hardware/software architecture may be employed. For example, external communication may be via a wired network connection. Arrangements with lower power and/or torque may be suitable for limited handling on hard surfaces and the invention could be extended if desired.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A ground movement system for a helicopter having a fuselage and rotor blades fixed to the top of the fuselage, the ground movement system comprising:
   at least three wheels secured below the fuselage of the helicopter, the wheels being retractable during flight;
   a motor positioned in the hub or on the undercarriage leg of each of at least two of the wheels;
   wherein each motor is operable to rotate the wheel in forward and backward directions;
   wherein each motor allows the wheel to rotate freely when unpowered;
   at least one user interface operable to receive user input commands to control the speed and direction of travel of the helicopter using the ground movement system; and
   a control arrangement to provide control signals to each of the motors based on the user input commands,
   wherein the control arrangement is operable to determine differential control signals for each motor based on user input commands to control the direction of travel according to the user input commands,
   wherein the at least one user interface comprises a helicopter user interface fixed within the helicopter cockpit and comprising a projecting user interface element movable between an up position and a down position,
   wherein in the up position the projecting user interface element protrudes from a surface of the helicopter user interface and is operable as at least one of a speed and steering controller for the ground movement system of the helicopter,
   wherein the projecting user interface element is tiltable to receive user input when in the up position but not when in the down position.

2. A helicopter ground movement system according to claim 1, further comprising a motor power source for the motors separate from the power source for the rotor blades of the helicopter.

3. A helicopter ground movement system according to claim 2, wherein the motor power source is an electrical battery power source, optionally detachable from the helicopter.

4. A helicopter ground movement system according to claim 3, wherein the electrical battery power source is chargeable using energy generated by an engine of the helicopter.

5. A helicopter ground movement system according to claim 3, further comprising a switching arrangement for selectively connecting the motor power source to a charging circuit to be charged by energy generated by an engine of the helicopter; and for disconnecting the electrical battery power source(s) from the charging circuit when the engine is not providing electrical power.

6. A helicopter ground movement system according to claim 1, wherein each motor is not more than 20 cm thick, and not more than 20 cm in diameter, preferably not more than 15 cm thick.

7. A helicopter ground movement system according to claim 1, further comprising:
a brake for each of the wheels, preferably located within the wheel hubs; and
wherein the control arrangement is operable to provide control signals to the brakes based on the user input commands.

8. A helicopter ground movement system according to claim 1, wherein the helicopter user interface comprises a rotatable and tiltable user interface element, such as a puck, and wherein rotating the user interface element provides a steering command to the ground movement system and tilting the puck provides a speed command to the ground movement system.

9. A helicopter ground movement system according to claim 1, comprising a mobile user interface provided on a mobile device operable to communicate the user input commands to the motors and steering actuators over a wireless interface, wherein the mobile user interface is provided in an application on a mobile computing device such as a tablet or smartphone.

10. A helicopter ground movement system according to claim 1, further comprising:
control logic operable to limit the speed of movement of the helicopter on the ground, wherein the control logic is operatively linked to the wheel motors.

11. A helicopter ground movement system according to claim 1, further comprising:
one or more proximity sensors arranged on the outside of the helicopter and operable to sense the proximity of external objects surrounding the helicopter and wherein the one or more proximity sensors are operable:
to communicate with the at least one user interface, wherein the at least one user interface is operable to provide a warning signal in the event the proximity sensor outputs indicate the helicopter comes to within a threshold distance of an external object; and
to communicate to the control arrangement proximity data indicative of the proximity of external objects, and wherein the control arrangement is operable to alter control signals that are based on the user input commands in dependence on the proximity data to avert a collision with an external object.

12. A helicopter ground movement system according to claim 1, further comprising:
one or more cameras arranged around the helicopter and operable to send live video images of the helicopter surroundings to the at least one user interface.

13. A helicopter ground movement system according to claim 1, further comprising:
one or more doors hingedly or slidably to the fuselage of the helicopter for each wheel, wherein the doors are arranged to enclose each wheel within the fuselage in a retracted position, and to open in order to allow the wheel to be deployed for landing.

14. A helicopter having a fuselage and rotor blades fixed to the top of the fuselage and comprising the ground movement system of claim 1.

15. A ground movement method for a helicopter having a fuselage and rotor blades fixed to the top of the fuselage and at least three wheels secured below the fuselage, the ground movement method comprising:
receiving user input commands to control the speed and direction of travel of the helicopter via a user interface;
determining, based on the received user input commands, control signals for a first motor positioned in the wheel hub of a first of the at least three wheels and arranged to rotate the first wheel and control signals for a second motor positioned in the wheel hub of the second of the at least three wheels and arranged to rotate the second wheel; and
communicating the control signals to each of the first motor and the second motor;
wherein the user interface comprises a projecting user interface element movable between an up position and a down position, wherein in the up position the projecting user interface element protrudes from a surface of the user interface and is operable as at least one of a speed and steering controller for ground movement of the helicopter, wherein the projecting user interface element is tiltable to receive user input when in the up position but not when in the down position;
and wherein the step of receiving user input commands comprises receiving user input commands by tilting of the projecting user interface element when the user interface element is in the up position.

16. A ground movement method for a helicopter according to claim 15, further comprising:
determining, based on the received user input commands, control signals for a first brake arranged to apply a braking force to the first wheel and control signals for a second brake arranged to apply a braking force to the second wheel; and
communicating the control signals to each of the first wheel and the second wheel.

17. A ground movement method for a helicopter according to claim 15, wherein the user interface is removable from the helicopter, and wherein the method further comprises:
transmitting the user input commands over a wireless communication interface from the user interface to a control arrangement operable to determine the control signals and communicate the control signals to each of the first motor and the second motor, and where applicable to each of the first wheel and the second wheel.

18. A ground movement method for a helicopter according to claim 15, further comprising:
receiving proximity data from one or more proximity sensors arranged on the outside of the helicopter, the proximity data being indicative of the proximity of one or more external objects to the helicopter;

determining from the proximity data within that the helicopter is within a threshold distance of an external object; and one or more of:

communicating the proximity data or data indicative of the proximity data to the at least one user interface; providing a warning signal on the user interface in dependence on the determination that the helicopter is within the threshold distance of an external object; and altering the determined control signals based on the proximity data prior to communicating the control signals to the first and second motors, and optionally to the first and second brakes.

\* \* \* \* \*